Patented Feb. 13, 1934

1,947,381

UNITED STATES PATENT OFFICE 1,947,381

REFRIGERATION PROCESS AND ADSORBENTS THEREFOR

Gerald C. Connolly and Ernest B. Miller, Baltimore, Md., assignor, by mesne assignments, to Chester F. Hockley, receiver for The Silica Gel Corporation, Baltimore, Md., a corporation of Maryland No Drawing. Application December 6, 1930
Serial No. 500,666

24 Claims. (Cl. 62—179)

The present invention which is a continuation in part of our applications Serial No. 427,649, filed February 11, 1930 and Serial No. 470,227, filed July 23, 1930, relates to refrigeration and more particularly to the type wherein the cooling effect is obtained by the evaporation of a liquid, and the vapor is taken up in a solid porous adsorbent.

Refrigerating systems of this type may comprise an evaporator or cooling chamber, containing the liquid to be evaporated or fluid evaporated by expansion through an orifice, an adsorber containing the adsorbing material, and a condenser for condensing the vapor driven off from the adsorbing material and returning it to said evaporator or cooling chamber. Where solid adsorbent material is employed for taking up the vapor from the cooling chamber, the adsorption must be effected in the substantially total absence of permanent gases, or the rate of adsorption will be so reduced that an effective cooling will not be secured. One form of apparatus suitable for the present invention is shown in Fig. 2 of Patent 1,729,081, granted September 24, 1929.

Various liquids may be employed in systems of this type, for instance, sulphur dioxide, water, ammonia, oxides, activated charcoal, etc. However, not all of the adsorbents can be employed with any one liquid, and, vice versa, not all of the liquids can be employed with any one adsorbent. Many of the combinations of adsorbent and liquid will operate at first, but after repeated cycles either there is a breaking down of the vapor, gradually forming permanent gases, or else there is a reaction between the vapor and adsorbent that reduces the adsorptive power of the adsorbing material.

Tests have shown that the combination of silica gel as the adsorbent and ammonia or an amine as the liquid, after repeated activations, is not so satisfactory as the combination of silica gel and sulphur dioxide, or silica gel and water. It is thought that with the ammonia or amine-silica gel system, action on the gel injures it, and perhaps permanent gases are formed.

The principal feature of the present invention is the provision of an adsorption refrigeration system that operates successfully with a solid, porous adsorbent and ammonia or an amine.

Another feature of the invention is that the preferred adsorbent has a very greatly increased effective adsorption capacity as compared with prior systems.

It has also been found that a solid microporous adsorbent material, impregnated with or having associated therewith a substance capable of combining readily with ammonia or an amine to form an ammino or amino compound respectively, will adsorb ammonia or an amine in the gaseous state in an adsorption refrigeration system without any substantial deterioration of the adsorbent material and without the formation of permanent gases.

The solid, porous, adsorbent material may be a dried gel containing at least one oxide such as the oxide of silicon, tungsten, tin, aluminum, or titanium, or a dried gel containing two or more of said oxides like alumina-silica gel, or a material having a pore structure similar to that of a dried gel, for example, base exchange compounds, or activated carbon. The base exchange compounds may be the natural occurring compounds such as glauconite, suitable natural zeolites and the like, or the artificially prepared compounds, for instance, sodium chromium silicate, potassium boron silicate, sodium vanadium silicate, and the like, or the porous structure remaining after leaching the base exchange compound with either acid or water. It is to be understood that any natural or artificial base exchange compound may be employed which has a fine porous structure. Of the materials mentioned, a dried gel such as silica gel is preferred.

The substances with which the solid adsorbent material may be impregnated are those salts of metals capable of readily combining with ammonia or an amine to form a metal ammino or amino compound respectively, under pressures such as occur in refrigerating systems of the type described herein, and, when heated to drive off or liberate the adsorbed ammonia or amine, will revert to the metal salt and ammonia or amine respectively. In other words, the salts of the metals with which the adsorbent material is impregnated are those which form simple or primary metal ammines or amines of the reversible type. Some of the salts of the metals which may be used are lithium chloride; silver nitrate or chloride; copper sulphate; magnesium chloride or sulphate; barium chloride; calcium chloride; zinc iodide, bromide, chloride, thiosulphate, perchlorate, chlorate, sulphate, nitrate, nitrite, or oxalate; strontium chloride; cadmium chloride or sulphate; lead chloride; manganous sulphate; and ferrous chloride or sulphate. Of the salts mentioned it is preferred to use those of the alkali forming metals such as lithium, calcium, or strontium chloride, although it is to be understood that any of the other metal salts may also be used.

Where it is desired to use an amine as the refrigerant, methylamine is preferably employed.

The amount of the metal salt with which the adsorbent material is impregnated is dependent upon the particular metal salt employed, and also the size of the pores of the adsorbent material. When gaseous ammonia reacts or combines with the anhydrous metal salt associated with the adsorbent material, the salt swells in forming the metal ammino compound. The amount of swelling varies with the different metal salts and also the number of ammonia molecules with which the salt combines, for instance, 2, 4, 6, or more molecules. Upon revivifying the adsorbent material, as by heating, the metal ammino compound is decomposed into the metal salt and ammonia, the ammonia being driven off and the metal salt remaining associated with the adsorbent material. An amine acts similarly in that it reacts or combines with the anhydrous metal salt associated with the adsorbent material to form a metal amino compound, and upon revivifying the adsorbent material, as by heating, the amino compound is decomposed into the metal salt and amine, the amine being volatilized and driven off and the metal salt remaining with the adsorbent material.

The pores of the adsorbent material should be only partially filled with the metal salt, for, if completely filled, the swelling that results from the combination of the salt and ammonia or amine will rupture the walls of the pores and thus injure or destroy the materials' adsorption capacity. It is a prerequisite that the pores of the adsorbent material contain only such an amount of the metal salt as will permit the expansion of the metal ammino or amino compound without rupturing the pore walls. Samples of gel impregnated with 10% to 30% have given good results. The exact amount is dependent upon the salt and method of impregnation or the type of material impregnated.

As a specific example of the material that may be used in the invention, reference may be made to silica gel impregnated with lithium, strontium, or calcium chloride. This impregnated gel adsorbs ammonia or an amine both chemically and physically, particularly when under pressures such as occur in the refrigerating cycle described herein. The adsorbent mass, such as silica gel impregnated with about 30% or less of lithium, strontium, or calcium chloride, does not swell when adsorbing ammonia or an amine in the manner that usually occurs when lithium, strontium, or calcium chloride by itself takes up ammonia or an amine.

It has been discovered, according to the present invention, that there is a marked increase in the adsorptive capacity of a gel impregnated with calcium chloride, for ammonia or an amine, as compared with plain gel. Under normal conditions occurring in the refrigerating cycle described above, that is, when the vapor is at about 20° F. and the condenser under 120 pounds gauge pressure at 75° F., plain silica gel adsorbs about 16% by weight of ammonia, while silica gel impregnated with 20% of calcium chloride adsorbs about 28%. After activation at 425° F., as usually occurs in this cycle, the residual amount of ammonia or amine in the plain gel is about 6% and in the impregnated gel about 8%. Thus, for the plain silica gel the useful saturation is about 10%, while for the impregnated gel the useful saturation is about 20%. It has been found that the system calcium chloride impregnated gel—ammonia or amine—gives about twice the refrigeration that is secured with the system plain gel—sulphur dioxide.

The refrigerating adsorbent consisting of a solid, porous, adsorbent material impregnated with a salt of a metal capable of combining with ammonia or an amine to form a metal ammino or amino compound may be prepared in any suitable manner. For example, a solid, porous, adsorbent material, such as a gel, base exchange compound, or activated carbon, is impregnated with a salt of a metal capable of combining with ammonia or an amine to form a metal ammino or amino compound. For this purpose any one of the metal salts previously mentioned may be used.

One method is illustrated by the impregnation of an adsorbent material with a salt like lithium, strontium, or calcium chloride. The adsorbent material is immersed or soaked in a 20% solution of either lithium, strontium, or calcium chloride for about 5 hours and then drained and dried. Before immersion in the salt solution, the adsorbent may be treated to prevent decrepitation, if desirable. The time of soaking should be such that the pores are only partially filled with the salt, after the drying step.

Although the usual adsorbent materials, such as gels, base exchange compounds, or activated carbons, may be employed, it is preferred to use adsorbents having larger pores than usually employed for gas adsorption, what may be termed "wide pore adsorbents". As previously explained, the pores should be only partially filled with the salt. If the adsorbent employed has wide pores, then it can be charged or impregnated with a larger percent by weight of the salt. Of course, the pores must not be enlarged to such an extent as to destroy or greatly reduce their action as capillaries. An illustration is found in a gel like silica gel having wide pores impregnated with lithium chloride. The apparent density of the material is an indication as to whether or not it has large or small pores. Apparent density is the weight in grams of a cubic centimeter of the material composed of particles having a definite size, i. e., particles that will pass an 8 mesh screen but remain on a 20-mesh screen. Silica gel having an apparent density of 0.65 or 0.7 after activation at 600° F. has smaller pores than silica gel of a less apparent density, say 0.6, after activation at 600° F. There are various methods of preparing low density gels. According to one method, a suitable washed hydrogel is impregnated with a substance soluble in a leaching medium chemically inert with respect to the gel, such as copper sulphate, aluminum chloride, sodium sulphate, calcium chloride, and the like, drying the impregnated hydrogel, and leaching out the substance with either water or acid, depending upon the particular substance used.

In this method a hydrogel is prepared in any suitable manner, for instance, in accordance with the instructions given in the Patrick Patent No. 1,297,724, as by adding, with agitation, a solution of sodium silicate to an equal volume of an acid solution, such as a 10% solution by weight of hydrochloric acid, the specific gravity of the silicate solution being about 1.185. The ratio of $SiO_2$ to $Na_2O$ in the silicate solution may be as in any commercial solution, about 3.25 to 1. After a time the reaction mixture or sol, as it is called, sets to a homogeneous jelly-like mass. This is broken into pieces and washed with water, preferably at 105° to 175° F., to remove salt and acid, and then soaked in a 10% to 15% solution of the salt, say calcium chloride, for about 4 hours, although solutions of other strengths may be employed. The solution is drained from the hydrogel, and then the hydrogel is dried in a current of air at about 125° C., which after a time may be increased to 400° C.

This method of making low density gels is claimed in application Serial No. 444,880, filed April 16, 1930.

The salt impregnated gel is leached with water, preferably hot water at about 180° F., and the leaching continued until substantially all of the calcium chloride has been removed or until the leaching water shows only a trace when tested with a solution of silver nitrate. Most of the calcium chloride leaches out rather readily, and the resulting solution can be used again for impregnating more hydrogel.

If the gel is of a type that decrepitates, before the leaching, it may be caused to adsorb 20% or 30% of water vapor to prevent decrepitation or shattering of the gel granules. This may be done by introducing a small amount of water vapor in the form of steam into a stream of air and then passing the air mixture over the gel. If desired, the gel particles may be arranged in a thin layer and then exposed to the atmosphere of the room in which steam may or may not be introduced.

The strength of the calcium chloride or other impregnating solution may be varied according to convenience, and the temperature at which the soluble material is leached out likewise may be varied according to convenience or necessity.

Here it is preferable, but not essential, to reactivate the leached gel at a relatively high temperature, say 1000° F.

The next step consists in charging the enlarged or wide pore gel with the desired salt such as lithium or strontium chloride. For this purpose the gel is immersed in the salt solution, say a 10% to 15% solution, for a time sufficient to only partially fill the pores. If the gel is of a type that decrepitates, it may be partly charged with water vapor, as previously described, before immersing in the salt solution. As the size of the pores in different adsorbents varies, no rule applicable to all adsorbents can be given as to the length of time for this treatment. For a gel made by the foregoing process, the immersion in the salt solution should last for about one hour or more, or the salt solution of proper strength may be sprayed on the gel. Usually the necessary amount of the salt solution, say 20% of the weight of the dry gel, is sufficient so that the solution will be just adsorbed by the pore space.

Then the solution is drained from the gel, and it is dried or activated as by passing a current of air at 600° F. over the same for about 3 hours.

According to another method of accomplishing this final step, the low density dried gel is impregnated with, say 30% or 40% of the dry weight of the gel with the salt, and this is immersed in water for a short time to reduce the salt content to the desired amount, say 20%.

It is to be understood that the process just described gives a very satisfactory product, but the invention is not limited to a product made in this way, as any other satisfactory process might be employed.

As an example of a method of making a salt impregnated alumina-silica gel, the following may be given. An alumina jelly is prepared by mixing equal volumes of a solution of aluminum sulphate of about 5% to 10% strength and a normal alkali solution such as sodium hydroxide or ammonium hydroxide at zero degrees C. or lower. Care should be taken that the reaction mass is alkaline. The jelly or gelatinous precipitate that forms is washed by decantation to free it of excess alkali and ammonium or sodium sulphate, depending upon the particular alkali employed in the formation of the precipitate.

The alumina jelly is then thoroughly mixed with washed silica hydrogel, prepared as described in the previous example, in the proportion of not more than one part of alumina jelly to ten parts of silica hydrogel by weight.

The intermixed mass of alumina-silica jelly and hydrogel is soaked in a solution of the salt, say lithium, strontium, or calcium chloride of about 10% to 15% strength for about 4 hours. Thereafter the solution is drained from the jelly, and the jelly is dried in a current of air at 125° C., which after some time may be increased to 400° C.

Although the impregnated adsorbent materials have been described in connection with refrigeration processes, they may also be used in processes for recovering ammonia or amines from gas mixtures containing these compounds. Such process comprises adsorbing the ammonia or amine contained in the gas mixture in a solid porous adsorbent material impregnated with a metal salt capable of combining with ammonia or amine to form metal ammino or amino compounds respectively, with or without pressure, and then recovering the adsorbed ammonia or amine as by heating the adsorbent material.

The term "evaporating" as used herein is intended to apply to any means for causing vapor to form from a liquid, whether by heat, or expansion through an orifice, or otherwise.

In the claims, the term "amo" is used to designate both ammonia and an amine; the term "amo compound" to cover the compounds obtained when a substance capable of combining with ammonia or an amine is contacted with ammonia or an amine to form an ammino or amino compound; and the term "metal amo compound" to cover both the metal ammino and amino compounds formed when a metal salt combines with ammonia or an amine respectively.

Having thus described the invention, what is claimed as new and desired to be secured by Letters Patent is:

1. A method of refrigeration consisting in evaporating liquid amo and adsorbing the gaseous amo, in the substantial absence of permanent gases, in a sorbent consisting of a gel impregnated with a substance capable of combining with said amo to form an amo compound.

2. The method according to claim 1 wherein the sorbent is silica gel.

3. The method of refrigeration consisting in evaporating liquid amo and adsorbing the gaseous amo, in the substantial absence of permanent gases, in a sorbent consisting of a gel impregnated with a salt of a metal capable of combining with said amo to form a metal amo compound.

4. The method according to claim 3 wherein the gel is silica gel.

5. The method according to claim 3 wherein the gel is silica-alumina gel.

6. The method according to claim 3 wherein the metal salt is calcium chloride.

7. The method according to claim 3 wherein the metal salt is lithium chloride.

8. The method according to claim 3 wherein the metal salt is strontium chloride.

9. The method according to claim 3 wherein the sorbent is only partially charged with the salt.

10. The method of refrigeration consisting in evaporating liquid amo and adsorbing the gaseous amo, in the substantial absence of permanent gases, in a sorbent consisting of silica gel impregnated with a salt of a metal capable of combining with said amo to form a metal amo compound, and activated to a water content of less than 4%.

11. The method according to claim 10 wherein the salt is calcium chloride.

12. The method according to claim 10 wherein the salt is lithium chloride.

13. The method according to claim 10 wherein the salt is strontium chloride.

14. The method according to claim 10 wherein the gel is silica-alumina gel.

15. The method according to claim 10 wherein the sorbent is only partially charged with the salt.

16. A method of refrigeration consisting in evaporating liquid amo and adsorbing the gaseous amo, in the substantial absence of permanent gases, in a sorbent consisting of alumina-silica gel impregnated with calcium chloride, the amount of the alumina being not substantially greater than 10% of the weight of the silica.

17. A method of refrigeration consisting in evaporating liquid amo and adsorbing the gaseous amo, in the substantial absence of permanent gases, in a sorbent consisting of alumina-silica gel impregnated with lithium chloride, the amount of the alumina being not substantially greater than 10% of the weight of the silica.

18. A method of refrigeration consisting in evaporating liquid amo and adsorbing the gaseous amo, in the substantial absence of permanent gases, in a sorbent consisting of alumina-silica gel impregnated with strontium chloride, the amount of the alumina being not substantially greater than 10% of the weight of the silica.

19. A method of refrigeration consisting in evaporating liquid amo and adsorbing the gaseous amo, in the substantial absence of permanent gases, in a sorbent consisting of alumina-silica impregnated with calcium chloride.

20. A method of refrigeration consisting in evaporating liquid amo and adsorbing the gaseous amo, in the substantial absence of permanent gases, in a sorbent consisting of alumina-silica impregnated with lithium chloride.

21. A method of refrigeration consisting in evaporating liquid amo and adsorbing the gaseous amo, in the substantial absence of permanent gases, in a sorbent consisting of alumina-silica impregnated with strontium chloride.

22. A method of refrigeration consisting in evaporating liquid amo and adsorbing the gaseous amo, in the substantial absence of permanent gases, in a sorbent consisting of silica gel impregnated with calcium chloride.

23. A method of refrigeration consisting in evaporating liquid amo and adsorbing the gaseous amo, in the substantial absence of permanent gases, in a sorbent consisting of silica gel impregnated with lithium chloride.

24. A method of refrigeration consisting in evaporating liquid amo and adsorbing the gaseous amo, in the substantial absence of permanent gases, in a sorbent consisting of silica gel impregnated with strontium chloride.

GERALD C. CONNOLLY.
ERNEST B. MILLER.